United States Patent
Jenkin et al.

(10) Patent No.: US 8,683,543 B2
(45) Date of Patent: *Mar. 25, 2014

(54) VIRTUAL SET-TOP BOX THAT EXECUTES SERVICE PROVIDER MIDDLEWARE

(75) Inventors: Geraint Jenkin, Pen coed (GB); Marcus C. Liassides, Merthyr Tydfil (GB); Jayne L. Gilmour, Chepstow (GB); Christopher G. Hooks, Cardiff (GB); David F. Evans, Cardiff (GB)

(73) Assignee: DISH Digital L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,608

(22) Filed: Sep. 11, 2012

(65) Prior Publication Data

US 2013/0007826 A1 Jan. 3, 2013

Related U.S. Application Data

(63) Continuation of application No. 12/556,443, filed on Sep. 9, 2009, now Pat. No. 8,332,905.

(60) Provisional application No. 61/095,738, filed on Sep. 10, 2008.

(51) Int. Cl.
| | |
|---|---|
| H04N 7/16 | (2011.01) |
| H04N 7/173 | (2011.01) |
| H04N 5/935 | (2006.01) |
| G06F 9/455 | (2006.01) |
| G06F 3/00 | (2006.01) |

(52) U.S. Cl.
USPC ........... 725/151; 725/152; 725/131; 725/132; 725/139; 725/140; 386/213; 386/214; 703/23; 703/24; 719/328

(58) Field of Classification Search
USPC ................. 725/151, 152, 131, 132, 139, 140; 386/213, 214; 703/23, 24; 719/328
See application file for complete search history.

(56) References Cited

U.S. PATENT DOCUMENTS

| | | | | |
|---|---|---|---|---|
| 4,535,355 | A | * | 8/1985 | Arn et al. ...................... 380/212 |
| 5,953,506 | A | * | 9/1999 | Kalra et al. ................... 709/231 |
| 5,999,979 | A | * | 12/1999 | Vellanki et al. ............... 709/232 |
| 6,003,045 | A | * | 12/1999 | Freitas et al. ......................... 1/1 |

(Continued)

FOREIGN PATENT DOCUMENTS

| | | |
|---|---|---|
| CN | 101098458 A | 1/2008 |
| EP | 1914940 A1 | 4/2008 |
| WO | 2006122024 A3 | 11/2006 |
| WO | 2007113410 A2 | 10/2007 |

OTHER PUBLICATIONS

USPTO "International Search Report" mailed Dec. 12, 2008; International Appln. No. PCT/US2008/061035, filed Apr. 21, 2008.

(Continued)

*Primary Examiner* — Hoang-Vu A Nguyen-Ba
(74) *Attorney, Agent, or Firm* — Ingrassia Fisher & Lorenz, P.C.

(57) ABSTRACT

A virtual set-top box (vSTB) for executing a middleware component, designed originally for use with the physical STB, including emulating hardware capabilities of the physical STB to process IPTV content received over a connection for presenting the IPTV content on a display of the electronic device.

20 Claims, 12 Drawing Sheets

(56) References Cited

U.S. PATENT DOCUMENTS

| | | | |
|---|---|---|---|
| 6,108,703 A * | 8/2000 | Leighton et al. | 709/226 |
| 6,195,680 B1 * | 2/2001 | Goldszmidt et al. | 709/203 |
| 6,366,614 B1 * | 4/2002 | Pian et al. | 375/240.02 |
| 6,490,627 B1 * | 12/2002 | Kalra et al. | 709/231 |
| 6,574,591 B1 * | 6/2003 | Kleiman et al. | 1/1 |
| 6,604,118 B2 * | 8/2003 | Kleiman et al. | 1/1 |
| 6,922,304 B2 * | 7/2005 | Nakagawa | 360/77.08 |
| 6,922,394 B2 | 7/2005 | Kajiwara | |
| 6,976,090 B2 * | 12/2005 | Ben-Shaul et al. | 709/246 |
| 7,133,368 B2 | 11/2006 | Zhang et al. | |
| 7,240,100 B1 | 7/2007 | Wein et al. | |
| 7,299,291 B1 | 11/2007 | Shaw | |
| 7,523,181 B2 | 4/2009 | Swildens et al. | |
| 7,590,703 B2 | 9/2009 | Cashman et al. | |
| 7,779,135 B2 | 8/2010 | Hudson et al. | |
| 7,861,273 B2 | 12/2010 | Fries et al. | |
| 8,332,905 B2 | 12/2012 | Jenkin et al. | |
| 8,418,207 B2 | 4/2013 | Jenkin et al. | |
| 2002/0026637 A1 * | 2/2002 | Markel et al. | 725/37 |
| 2002/0152318 A1 | 10/2002 | Menon et al. | |
| 2002/0162112 A1 | 10/2002 | Javed | |
| 2003/0014684 A1 | 1/2003 | Kashyap | |
| 2003/0151753 A1 | 8/2003 | Li et al. | |
| 2003/0154239 A1 | 8/2003 | Davis et al. | |
| 2004/0083283 A1 | 4/2004 | Sundaram et al. | |
| 2004/0103444 A1 | 5/2004 | Weinberg et al. | |
| 2005/0021862 A1 | 1/2005 | Schroeder et al. | |
| 2005/0081218 A1 | 4/2005 | Acott et al. | |
| 2005/0108414 A1 | 5/2005 | Taylor et al. | |
| 2005/0120107 A1 | 6/2005 | Kagan et al. | |
| 2005/0188051 A1 | 8/2005 | Sneh | |
| 2006/0036436 A1 | 2/2006 | Halcrow et al. | |
| 2006/0080718 A1 | 4/2006 | Gray et al. | |
| 2006/0101495 A1 | 5/2006 | Yoshida et al. | |
| 2006/0184972 A1 | 8/2006 | Rafey et al. | |
| 2006/0206246 A1 | 9/2006 | Walker | |
| 2006/0206581 A1 | 9/2006 | Howarth et al. | |
| 2006/0277316 A1 | 12/2006 | Wang et al. | |
| 2007/0121728 A1 | 5/2007 | Wang et al. | |
| 2007/0199039 A1 | 8/2007 | Diroo et al. | |
| 2008/0022084 A1 | 1/2008 | Raftelis et al. | |
| 2008/0046909 A1 | 2/2008 | Smetana et al. | |
| 2008/0060035 A1 | 3/2008 | Tsang et al. | |
| 2008/0069350 A1 | 3/2008 | Reinoso | |
| 2008/0120671 A1 | 5/2008 | Sim et al. | |
| 2008/0141317 A1 | 6/2008 | Radloff et al. | |
| 2008/0195698 A1 | 8/2008 | Stefanovic et al. | |
| 2008/0219151 A1 | 9/2008 | Ma et al. | |
| 2008/0225698 A1 | 9/2008 | Smith et al. | |
| 2008/0244660 A1 | 10/2008 | Wodka et al. | |
| 2008/0301744 A1 | 12/2008 | Hutchings | |
| 2008/0307484 A1 | 12/2008 | Dandekar et al. | |
| 2009/0019480 A1 | 1/2009 | White | |
| 2009/0019505 A1 | 1/2009 | Gopalakrishnan et al. | |
| 2009/0052540 A1 | 2/2009 | Gutman et al. | |
| 2009/0063983 A1 | 3/2009 | Amidon et al. | |
| 2009/0077614 A1 | 3/2009 | White et al. | |
| 2009/0183213 A1 | 7/2009 | Mukerji et al. | |
| 2009/0241143 A1 | 9/2009 | White et al. | |
| 2009/0252329 A1 | 10/2009 | Casey et al. | |
| 2009/0284652 A1 | 11/2009 | Bennett et al. | |
| 2009/0300673 A1 | 12/2009 | Bachet et al. | |
| 2010/0017832 A1 | 1/2010 | Wang | |
| 2010/0064335 A1 | 3/2010 | Jenkin et al. | |
| 2010/0186053 A1 | 7/2010 | Zhang et al. | |
| 2013/0347045 A1 | 12/2013 | Jenkin et al. | |

OTHER PUBLICATIONS

Edwards, W. Keith et al. "An Extensible Set-Top Box Platform for Home Media Applications" IEEE 2005.

United Kingdom Intellectual Property Office "Patents Act 1977: Search Report Under Section 17(5)," mailed Dec. 24, 2009; Application No. GB822236.6, filed Dec. 5, 2008.

European Patent Office, International Searching Authority, "International Search Report," mailed Dec. 29, 2009; International Application No. PCT/GB2009/002167, filed Sep. 10, 2009.

Peltotalo, Jani et al. "A Massively Scalable Persistent Content Distribution System," Proceedings of the Sixth IASTED International Conference on Communications, Internet, and Information Technology; Jul. 2-4, 2007, Banff, Alberta, Canada; Acta Press, vol. 575, Jul. 2, 2007, p. 7PP, XP009126743; ISBN: 978-0-88986-673-7, p. 1, left-hand column, line 1—p. 3, right-hand column, line 14.

Couto Da Silva, Ana Paula et al. "A Bandwidth-Aware Scheduling Strategy for P2P-TV Systems," Peer-To-Peer Computing, 2008, P2P '08; Eighth International Conference on, IEEE, Piscataway, NJ, USA; Sep. 8, 2008, pp. 279-288, XP031322350; ISBN: 978-0-7695-3318-6, p. 279, left-hand column, line 26—p. 279, right-hand column, line 17.

Wesleyclover.com, "INUK Networks Launches World's first PC-based Virtual Set-top Box; Delivering a True Television Experience to the PC", httQ://wesle~clover.com/index.QhQ?OQtion=com_content&task=view&id=448&1temid=1 ~ (Sep. 7, 2007), 1-2.

United Kingdom Intellectual Property Office, "Examination Report Under Section 18(3)," mailed Mar. 5, 2012; Application No. GB0822236.6.

ITVTWP, "Inuk Integrates SecureMedia's CNDRM Technology with igloo", httQ://blog.itvt.com/2008/10/06/m ag net-networks-selects-in u ks-ig loo-vi rtu al-set-toQbox-software/, (Oct. 6, 2008), 1-3.

ITVT, "INUK Launches PC-Based Virtual Set-Top Box, "Igloo"", httQ://blog.itvt.com/storw1444/inuk-launches-Qc-based-virtual-set-toQ-box-igloo, (Oct. 15, 2007), 1-4.

Informitv.com, "Inuk igloo provides cool set-top box for personal computers", http://linformitv.com/news/2007/09/12/inukialooprovides/ (Sep. 12, 2007), 1-2.

Harris, Jan, "Inuk Networks announces launch of igloo set-top box", httQ://www.iQtv-watch.co.uk/20092007-in u k -networks-an nou nces-lau nch-of -igloo-settoo-box.html (Sep. 20, 2007), 1-5.

Clover, Julian, "Magnet pulls in Igloo PCTV Solution", http://www.broadbandtvnews.com/?o=8027 (Sep. 10, 2008), 1-3.

Canadian Intellectual Property Office, Office Action, dated Oct. 3, 2013 for Canadian Patent Application No. 2,736,330.

* cited by examiner

VIRTUAL SET-TOP BOX THAT EXECUTES SERVICE PROVIDER MIDDLEWARE

RELATED APPLICATIONS

This application is a continuation of U.S. application Ser. No. 12/556,443, now U.S. Pat. No. 8,222,905, filed on Sep. 9, 2009, which claims the benefit of U.S. Provisional Application No. 61/095,738, filed Sep. 10, 2008, and which is hereby incorporated by reference. This application is related to co-pending U.S. application Ser. No. 12/556,347, entitled "Dynamic Video Source Selection," filed herewith.

FIELD OF THE INVENTION

This invention relates to Internet Protocol Television (IPTV) technology and, specifically, to a system and method for providing an IPTV service to a user such that the user may view programming content on a device such as a computer, the presentation and functionality associated with traditional programming paradigms being maintained.

BACKGROUND OF THE INVENTION

In the traditional television paradigm, programming content is sent as an analogue or digital signal to a viewer's television set via cable, satellite or through the air. The signals are then received, processed and displayed for the viewer to watch on the screen of the television set.

However, with the exoteric spread of portable electronic devices, such as laptop computers, viewers no longer wish to be restricted to watching television via a conventional television set which is, more or less, confined to use in one physical location. Given the desire or need for portability, and the ubiquitous presence of Internet-based technologies within modern computing equipment, the ability to receive IPTV services via computing equipment is becoming increasingly important from both a consumer's (i.e. viewer's) perspective and from the perspective of the service providers who seek to commercialize the opportunities.

Thus, the monopoly of the traditional television paradigm is being eroded and challenged by the development of Internet Television (Internet TV) and Internet Protocol Television (IPTV) technologies.

Internet TV enables a user to select programs from a list and is typically delivered over an IP network in the form of streaming video via a website. The content is embedded into a web page, and accompanying text is typically wrapped around the streaming video which is presented to the viewer within a separate window. In some ways, this presentation style is similar to a newspaper page wherein surrounding text flows around, not over the image, albeit that the static image is replaced by a video component.

By contrast, a typical IPTV system enables delivery of a digital television service to a viewer over a closed network infrastructure. The delivery is performed using Internet Protocol and typically includes a broadband connection. The IPTV system receives and displays the video stream, which has been encoded as a series of Internet Protocol (data) packets. IPTV can be in the form of live TV, but also as stored video—sometimes known as 'video on demand' (VOD).

Traditionally, the viewer must use a device known as a set-top box (STB) in conjunction with his/her television set in order to receive and view IPTV. The set top box acts as an interface between the television and the network, decoding the incoming video streaming media, converting it into standard television signals and providing two-way communications over the IP network. It also performs functional processing, such as setting up the connection and quality of service (QoS) with the service node, channel change functionality and user display control. This functionality is achieved via the use of software known as 'middleware'.

'Middleware' is a key component within the IPTV solutions architecture. It is the application software layer that acts as an interface between the user interface and the hardware/operating system (OS) of the STB. Middleware vendors adopt abstraction based strategies to isolate themselves from the underlying hardware.

However, service providers can find it challenging to make the IPTV business model commercially viable due to the (often relatively high) cost of STBs. This is compounded by the linear nature of the cost/functionality line of STBs—the more features or functions the STB is required to posses, the higher the cost of the device. This has prompted IPTV service providers to investigate the possibilities of delivering their services to mass market end user devices (such as personal computers) where the cost of the hardware has already been borne by the end user/viewer. Thus, if standard computing components can be used to mirror and mimic their televisual counterparts (e.g. monitor, CPU, disk used to replace TV, STB, VCR respectively) then functionality can be maintained whilst eliminating the cost and inconvenience of a required STB.

In order to receive IPTV services and view them on other devices, such as a personal or laptop computer, there is a need, therefore, for the computer itself to perform the functional processing discussed above in relation to the STBs used with televisions.

Thus, there is a need for a system which provides the seamless delivery of IPTV services to an alternative device such as a computer. Ideally, such a system would be arranged and configured such that it can be integrated with existing IPTV technologies. This integration work is required, primarily, in 3 areas:

1) Video delivery: the solution must be based on standard broadcast technologies, and not those which have emerged in relation to web-based (Internet TV) services. This is because of the difference in viewing experiences discussed above, primarily in the segregation of text and moving images.
2) Conditional Access (CA): service providers require a means of controlling and managing access to the services. Subscribers may opt for varying levels of service, and thus access to the content must be controlled via a conditional access system. This is typically implemented via the use of virtual or traditional hardware 'smart cards' used in conjunction with STBs. Ideally such a system is managed from a single installation of the customer's CA head-end and allows rights to be managed seamlessly over heterogeneous display devices.
3) Middleware: middleware plays a key role in any IPTV system, and determines the presentation layer of most services. The choice of middleware is determined by the viewer's chosen service provider and is typically of a client/server architecture, the client residing on the STB. Typically, middleware includes an application management component, an execution environment, and the ability to access libraries (Application Programming Interfaces—known as APIs) to control the underlying hardware/OS.
   Broadly speaking, known $3^{rd}$ party middleware can be categorized into two types:

i) Category I middleware: middleware which is embedded within the Document Object Model (DOM) of a STB's embedded browser. These products use vendor-provided extensions to that environment, in the form of ECMAScript libraries, to control the media management elements of the service and utilize standards based rendering technologies to render their user interfaces—such as HTML & SVG;

ii) Category II middleware: middleware that is written directly on top of the low-level APIs (typically implemented in languages such as C or C++) provided by the STB vendors to control the media management elements of the service and typically utilize proprietary based rendering technologies to render their user interfaces.

Both approaches suffer from the problem that the STB vendor provided APIs (both ECMAScript and C/C++) are not standardized and, therefore, each middleware vendor must perform a 'porting' exercise each time a new STB is to be added to their portfolio of supported end user devices.

Another problematic area facing would-be computer-based IPTV systems is that most known IPTV systems are designed to deliver IP encapsulated MPEG-2/4 content at 2 to 4 Mbps to users on multicast enabled networks. To date, the general lack of multicast support within large portions of the available networks restricts the number of potential target clients. There are several commercial and technical factors in existence, which remain barriers to the effective delivery of these services.

End users of television services are typically unconcerned with the underlying delivery mechanism employed to deliver the picture to their device (e.g. DTT, IP etc.). However, they are concerned about the quality of the content which they wish to view and the ease of use with which they access that optimal-quality content.

Therefore, a preferred solution should be capable of presenting a high quality service and consistent navigational paradigm to the viewer, whilst (behind the scenes) detecting, selecting and presenting the best quality programming possible based upon the current position of the viewer's device within the network (regardless of multicast support).

In other words, the solution should incorporate a dynamic video source selection (DVSS) mechanism, such that the user is provided with a single experience, of optimal quality on any network.

Known solutions attempt to address some of these difficulties, although they typically involve considerable expense from the service provider to effectively create a parallel distribution mechanism (encoding, encryption, delivery, middleware integration, device integration etc.), and typically provide a different viewing experience (in terms of presentation style and format, navigational interfaces etc.) from that which the viewer would expect from a traditional television based service.

In addition, many proposed solutions focus on how to deliver IPTV content to an end user, rather than how to process and/or display that content once it has been received at the client end, or how to improve/replace the technology employed at the client end.

For example, EP1895777 A1 discloses a method of providing an IPTV service to a subscriber, and a network element for executing said method. This is achieved by introducing an additional tier (an 'intertwine' tier) into the traditional 3 tiered IPTV architecture. This intertwine tier comprises IPTV service routers and a communication network, thus enabling provision of an IPTV service between different networks which may belong to different operators and/or be installed in different countries. Thus, the invention adds roaming functionality to the existing IPTV service.

However, the method and element disclosed in EP1895777 A1 do not enable a subscriber to receive and display ITPV content on an alternative device, such as a computer. Instead, the disclosed invention provides an alternative architecture for delivery of the programming content to the subscriber and does not address the issues discussed above concerning the technology employed at the client end.

Similarly, WO 2008/045384 A2 discloses an IPTV transport architecture with double layer encryption and bulk decryption. The disclosed invention is designed to operate in accordance with a client's traditional television/STB combination, and does not provide a means of presenting the programming content on an alternative device.

A number of systems are known in relation to STB simulation, for the purpose of testing constrained, isolated aspects of IPTV service delivery.

For example, the invention disclosed in EP 1914940 A1 provides a test apparatus for assessing the quality of an IPTV service, and to locate and repair malfunctions. The test apparatus accesses the IPTV network (from a central office) as a simulation of the user's STB, receives and analyses channel information and media contents downloaded from the IPTV network, and then generates test results. This obviates the need for an operator to enter the user's premises and perform the test routine using manual test apparatus. Thus, the STB simulation performed by the disclosed invention is limited such that it only simulates the way in which the STB presents itself to the network and receives information from the network. It does not present a fully operable STB emulation system which could be used to replace a user's STB and television and present the received content to the viewer. Thus, it does not provide a means of performing all the functions required and expected of a physical STB.

Similarly, US 2002/0026637 A1 discloses a computer program which allows a personal computer to emulate the functions of various STBs so that a combined video and an enhanced content stream can be displayed and randomly accessed to ensure that a desired layout is achieved with respect to the displayed content. The program is designed to facilitate quick and easy checking of the quality of the content presentation, with modification to the combined content stream being permitted during the checks if required. Thus, only one aspect of a traditional STB functionality is addressed by the disclosed invention, which does not provide a complete, alternative system for use in presenting IPTV content to an end user. The disclosed invention provides a means of pre-viewing video and interactive content by a producer rather than presenting a complete service to a user.

Neither US 2002/0026637 A1 nor EP 1914940 A1 address the problem of integrating different forms of existing middleware products with a STB emulation system. Neither do they include simulation components to support or emulate other traditionally required functions such as conditional access and other network management functions.

Thus it is an object of the invention to provide a means for receiving IPTV services on a user's device such as (but not exclusively) a personal computer, and presenting the IPTV content on the device, such that the viewer enjoys continuity of programming service regardless of his/her physical location or the underlying hardware/software platform of the device.

Thus, it is an object of the invention to provide a system and method for the simulation of a physical STB, and to enable standard computing components to mirror and mimic their televisual counterparts (e.g. monitor, CPU, disk→TV, STB, VCR).

It is an object of the invention to provide a solution which can be easily integrated with known IPTV technologies.

It is a further object of the invention to maintain substantially the same viewing experience as that experienced by a user when receiving and viewing televisual services via traditional (i.e. television plus physical STB) or alternative technologies. In other words, the content, navigational paradigm, presentation and quality of service must be substantially the same as those enjoyed by users of traditional IPTV systems.

It is a further object of the invention to provide a means of receiving and presenting said IPTV service such that $3^{rd}$ party category I or category II middleware, designed for execution by a physical STB, can execute in its usual manner and provide the same functionality on the viewer's computer without modification. The maintained functionality will typically include the ability to perform presentation layer rendering, video blending and multi-media control, and the provision of User Interfaces.

Thus, it is an object of the invention to provide a virtual STB application environment which not only emulates the underlying hardware capabilities of a physical STB (e.g. video scaling, video positioning, chroma keying, alpha blending, UI layout, Remote Control key handling etc.) but also provides the same software environment in terms of available APIs and libraries such that $3^{rd}$ party middleware is able to execute in this environment without modification.

It is a further object of the invention to provide a Conditional Access (CA) mechanism such that a service provider is able to control and manage the user's ability to access the programming content, said mechanism being easy to deliver and manage from a network/provider's perspective.

It is a further object of the invention to provide an IPTV system wherein the system is resource efficient (especially in respect of CPU usage and memory).

It is a further object of the invention to provide an IPTV system for receiving and presenting IPTV services on a user's device such that dynamic video source selection (DVSS) is achieved, wherein the system is able to determine and acquire the optimal quality programming possible based on the current position of the user's device within the network. It is preferred that this source selection is achieved dynamically, without the need for explicit input from the user.

Thus, the present invention provides a means of eliminating or alleviating at least one of the above identified problems, and achieving at least one of the above identified objectives.

SUMMARY OF THE INVENTION

In accordance with a first aspect of the present invention, there is provided a set-top box emulation system for presenting IPTV content to a user on an electronic device, said emulation system comprising:
  i) a middleware component;
  ii) a plurality of management components arranged and configured to emulate the capabilities of a physical set-top box, wherein the plurality of management components comprises at least one of a presentation manager, a codec manager and/or a conditional access manager; and
  iii) a plurality of interfaces to enable communication between said plurality of management components and said middleware, wherein the plurality of interfaces comprises at least one of a graphics interface, a MUX interface, a Conditional Access interface, a Media interface, and Events Interface, a System Settings interface and/or a Persistent Storage interface.

In a preferred embodiment of this first aspect, an IPTV system is arranged and configured such that a viewer can receive and watch IPTV televisual content displayed on an electronic device, said device acting as an alternative to a traditional television and STB combination. In a typical embodiment, said device is a personal or laptop computer, although other electronic devices may be used.

It is preferred that the televisual content is delivered from a service provider's head-end in the same way that it would be delivered to a STB being used in conjunction with a television set. When viewing said televisual content in accordance with the present invention, the navigational and presentation styles are maintained, and the format of the content is the same or substantially the same as that experienced by a viewer using a physical STB and television set.

Essentially, the invention provides a means for emulation of a traditional (physical) STB such that a virtual STB environment is created within the viewer's computer. The emulation is achieved by a software-based system which creates a virtual STB environment for other (known) software to interact with, such that the emulation system running on the computer presents itself to the network (and service provider) as if it were a physical STB connected to a television.

Preferably, the present invention has $3^{rd}$ party middleware embedded within it, said middleware being appropriate to the viewer's chosen service provider. That is to say, the virtual STB component acts as a wrapper around a vendor's middleware. Thus, a STB emulation component is installed on the end user's (i.e. viewer's) device, said emulation component encapsulating $3^{rd}$ party middleware which is appropriate for and compatible with the delivery system deployed by the user's chosen IPTV service provider.

Thus, in accordance with a first aspect of the invention, there is provided an API-based STB emulation environment within which known $3^{rd}$ party middleware (both category I and II) is able to execute. The execution and performance of the middleware is preserved in its traditional form, and the $3^{rd}$ party middleware interacts with the virtual STB environment (i.e. with the invention) as it would with a traditional STB operating within a traditional IPTV system. No modification of the vendor's middleware is required.

Thus, the viewer is able to view televisual content on an electronic device such as a personal or laptop computer, or other electronic device, by providing a virtual STB environment within the device, said virtual environment being able interface and interact with known $3^{rd}$ party middleware such that all aspects of functionality, performance and presentation formats are substantially identical to those enjoyed by users of a traditional IPTV (i.e. STB plus TV) configuration.

In accordance with a second aspect of the invention, the STB emulation component emulates the underlying hardware capabilities of a physical STB, thus enabling the same functionality (such as video scaling, video positioning, chroma keying, alpha blending, User Interface (UI) layout, Remote Control key handling and so on). These functions are emulated by a plurality of sub-components, each sub-component handling the emulation of a particular STB function. Each sub-component may, in turn, comprise one or more further sub components.

In a preferred embodiment of the first aspect of the invention, the sub-components of the STB emulation component may include (but are not restricted to) a player component, an embedded web browser, a management component, a decryption component and a set of one or more API libraries.

The STB emulation component may be configured, or tailored, to the viewer's (or service provider's) requirements via the use of configuration files, which store settings to enable and facilitate the management and control of the behavior of the STB emulation component.

In addition to the STB emulation environment, there is provided a set of core APIs which act as conduits into the $3^{rd}$ party middleware executing within the virtual (i.e. emulated STB) environment. These APIs are essential to the performance of the claimed invention.

The APIs service requests made by external applications and expose the functionality of the middleware to those applications. Thus, the STB emulation component operates in conjunction with the set of core APIs to enable the maintenance of connectivity between standard category I and II middleware and the IPTV service provider.

In other words, in order to facilitate management from the network operator perspective, there needs to be direct access into the embedded middleware by the service provider. If the middleware belongs to category I, this is achieved by DOM connectivity. If, however, the middleware belongs to category II then connectivity is achieved via the middleware's APIs which connect to the set of core APIs provided in accordance with the invention.

Thus, the emulated environment provided by the present invention is agnostic to $3^{rd}$ party middleware connectivity.

In a preferred embodiment of a first aspect of the invention, the APIs provide the following essential capabilities, although other interfaces may be included so as to extend the set of capabilities or, alternatively, some may not be required in alternative embodiments: a Graphics Interface, a MUX interface, a conditional Access (CA) Interface, a Media Interface, a Network Interface, an Event interface, a System Settings Interface and a Persistent Storage Interface.

In accordance with a second aspect of the invention, the middleware selected for use with the arrangement described above is category II (i.e. API-based) middleware. In a preferred embodiment, the user interface is handled by the category II middleware. The APIs provided in accordance with the present invention 'plug into' (i.e. provide connectivity with) the APIs provided within the $3^{rd}$ party category II middleware.

Thus, the category II middleware is able to operate within the emulated environment without any alteration or modification, even though it was designed originally for use with a physical STB (and television set) rather than a computer system.

In accordance with a third aspect of the invention, the arrangement described in relation to the first aspect is configured for use with category I (i.e. browser-based) middleware. In accordance with the third aspect of the invention, and in addition to the features listed in relation to the first aspect, there is provided a proprietary web browser. Preferably, the set of core interfaces described above (graphics interface, events interface etc.) integrate, or connect, with the proprietary browser. In a preferred embodiment, the user interface is handled by the proprietary browser, working in conjunction with the category I middleware.

In accordance with the third aspect of the invention, a set of STB emulation APIs (written in ECMAScript) is inserted into the DOM of the browser. Third party category I middleware is also inserted into the DOM of the browser. The STB emulation APIs emulate and/or replace the APIs which would traditionally be provided by the STB vendor. They take DOM requests and translate them into API requests.

Thus, the category I middleware is able to operate within the emulated environment without any alteration or modification, even though it was designed originally for use with a physical STB rather than a computer system.

For the sake of clarity, it should be noted that a typical embodiment of the emulation system described herein provides at least two sets of distinct APIs:

1) the set of APIs which are embedded within the proprietary browser's DOM, providing genuine STB API emulation. These are written in ECMAScript so as to enable their integration with the embedded browser which forms a sub-component of the STB emulation component; and 2) the set of APIs which are provided to enable the integration of $3^{rd}$ party vendor middleware. These are written in a language such as C or C++, and provide an extensible interface between the $3^{rd}$ party category II middleware and the underlying STB features. These are the fundamental links into the middleware encapsulated or nested within the emulated environment, and virtualize the core functions and hardware of the traditional (physical) STB as listed above.

According to a fourth aspect of the invention, there is provided a Dynamic Video Source Selection (DVSS) component arranged and configured for use with the present invention.

As previously stated, viewers of IPTV programming content are not generally concerned with the underlying delivery mechanism(s) used to provide their viewing content. They do, however, care about the quality of that content, and the ease with which they can access their desired programs.

Thus, there is a need to provide, for the viewer, a consistent navigational paradigm whilst, behind the scenes, determining and acquiring the best quality programming available based upon the current position of the client device within the network. In summary, the aim of the DVSS component is to provide a consistent viewing experience, using any network, whilst maintaining optimal quality of service.

In addition, the provision of a DVSS component removes the need for a closed network, and allows the client device to receive 'regular' DVB based broadcast feeds (typically via a USB-based DVB-T dongle) and thus it is not mandatory that the video packets received via the network are encapsulated in IP. This approach is usually referred to as a 'hybrid' approach.

The functionality of the DVSS component can be decomposed into a number of key technical areas:

1) Dynamic network awareness: the client device needs to be aware of the environment in which it finds itself. This implies an ability to detect the capacity of a network to deliver multicast traffic and, if so, at what bitrate. The bitrate calculation should also take into account the possibility of two (or more) devices which are attempting to source content over the same DSL line.

2) Dynamic addressing and sourcing: This implies that the metadata collected at the head-end should not multiply based on the number of delivery mechanisms available to us. A simpler approach would be to use a common identifier for the content and then allow the client to determine the appropriate delivery mechanism. For example, a channel asset is typically created for Channel1 by associating it with a URL in the form of IGMP:// xxx.xxx.xxx.xxx:5000. This is unfortunate, as it strongly implies that a multicast network is available (IGMP). However, in accordance with a fourth aspect of the present invention, a DVSS component provides the ability to issue the appropriate requests independent of original URI based information—this could, perhaps, be from multicast, USB based DVB-T devices or other streaming technologies such as p2p or streamlets.

3) Network management: In order to deploy the present invention to many residential viewers, it is essential that it is capable of providing a network management feature that allows operators the ability to manage it as if it were a network device such as a STB or router. This is achieved by the implementation of a TR-135 client that allows the invention to be managed by standards-based TR-069 based management servers.

These and other aspects of the present invention will be apparent from and elucidated with reference to, the embodiment described herein.

BRIEF DESCRIPTION OF THE DRAWINGS

An embodiment of the present invention will now be described, by way of example only, and with reference to the accompanying drawings, in which.

DETAILED DESCRIPTION OF THE PREFERRED EMBODIMENT

Figure 7:
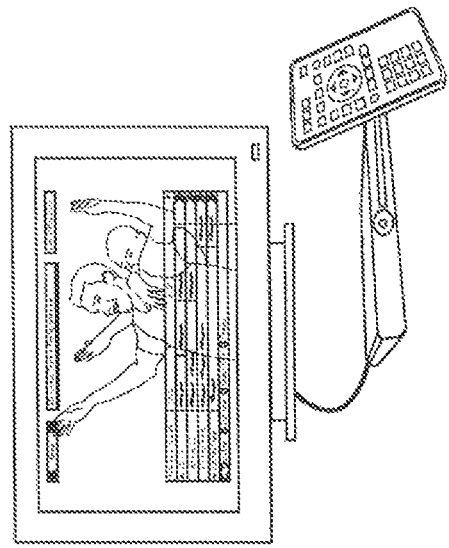
FIG. 7 shows the architecture of a typical, traditional IPTV system which utilizes a physical STB.
Figure 7:
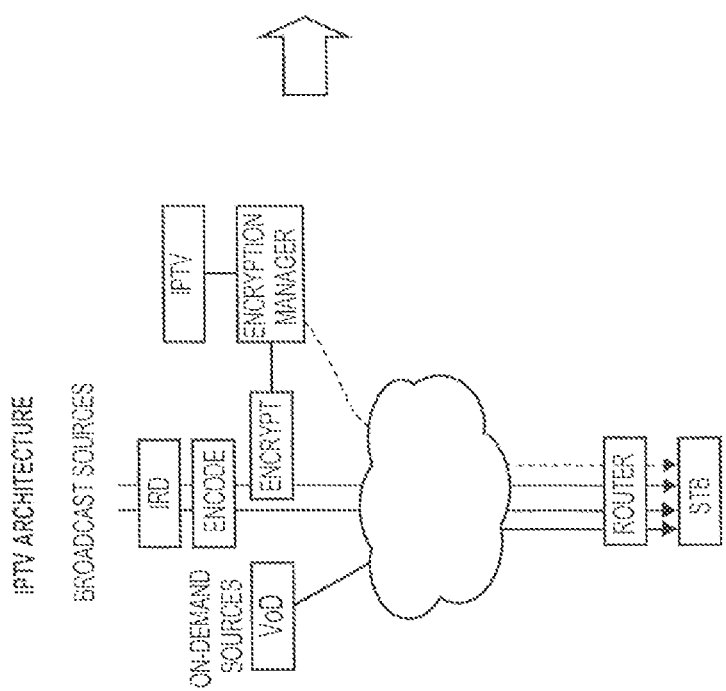

With reference to the above listed Figures, FIG. 7 shows how, in a traditional IPTV arrangement comprising a physical STB, content is delivered to a viewer's television set such that the presentation style of the content is the same as that experienced by the viewer when using a non-IPTV based delivery system. As FIG. 7 shows, signals are transmitted from the service provider over a network, and are forwarded by a router to the viewer's STB. The STB, which is connected to the viewer's television set, processes the signals such that the content can be displayed on the television screen in a style and format identical to that experienced in the more 'traditional' television broadcasting paradigms.

The present invention removes the need for a traditional (i.e. physical) STB or television set, and provides a software-based emulation environment such that the signals can be received, processed and viewed on an alternative device, such as a computer, without loss or adaptation of service, presentation style or functionality.

Figure 1:
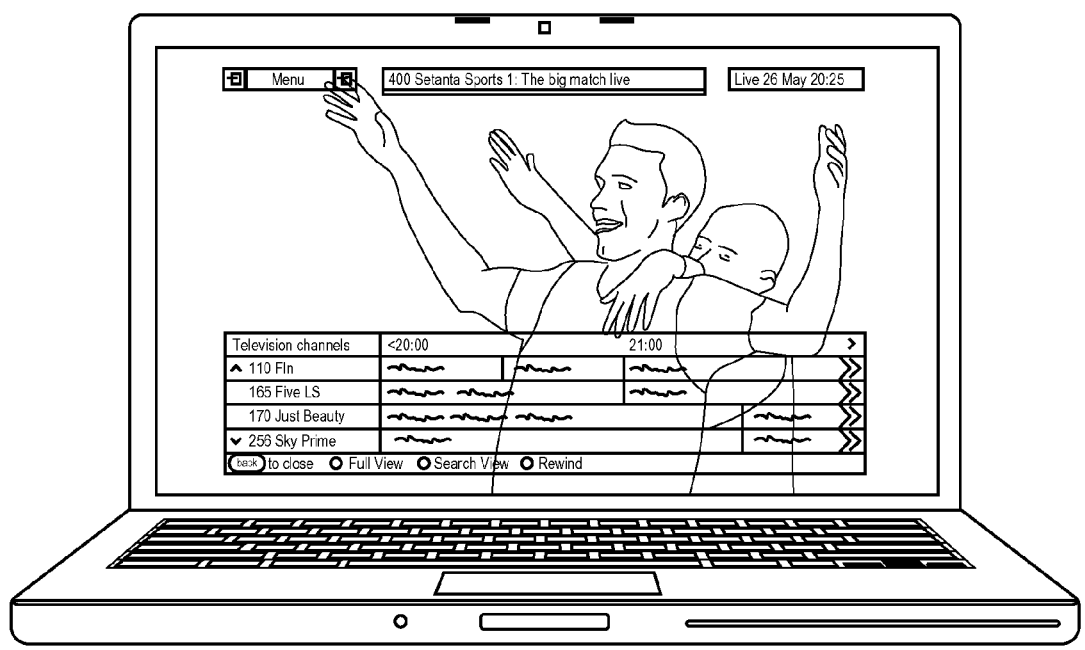
FIG. 1 shows a computer executing a $3^{rd}$ party middleware running in conjunction with the present invention, despite the middleware having been designed for use with a traditional STB.

This maintenance of viewing experience is illustrated in FIG. 1, which shows a laptop computer configured for use in accordance with the present invention, and illustrates how the invention has been architected to deliver a rich multi-media televisual experience akin to that traditionally associated with a physical STB and television set. The image shows the end result of how the $3^{rd}$ party middleware has elected to render the user interface and video layers with respect to each other.

Figure 10:
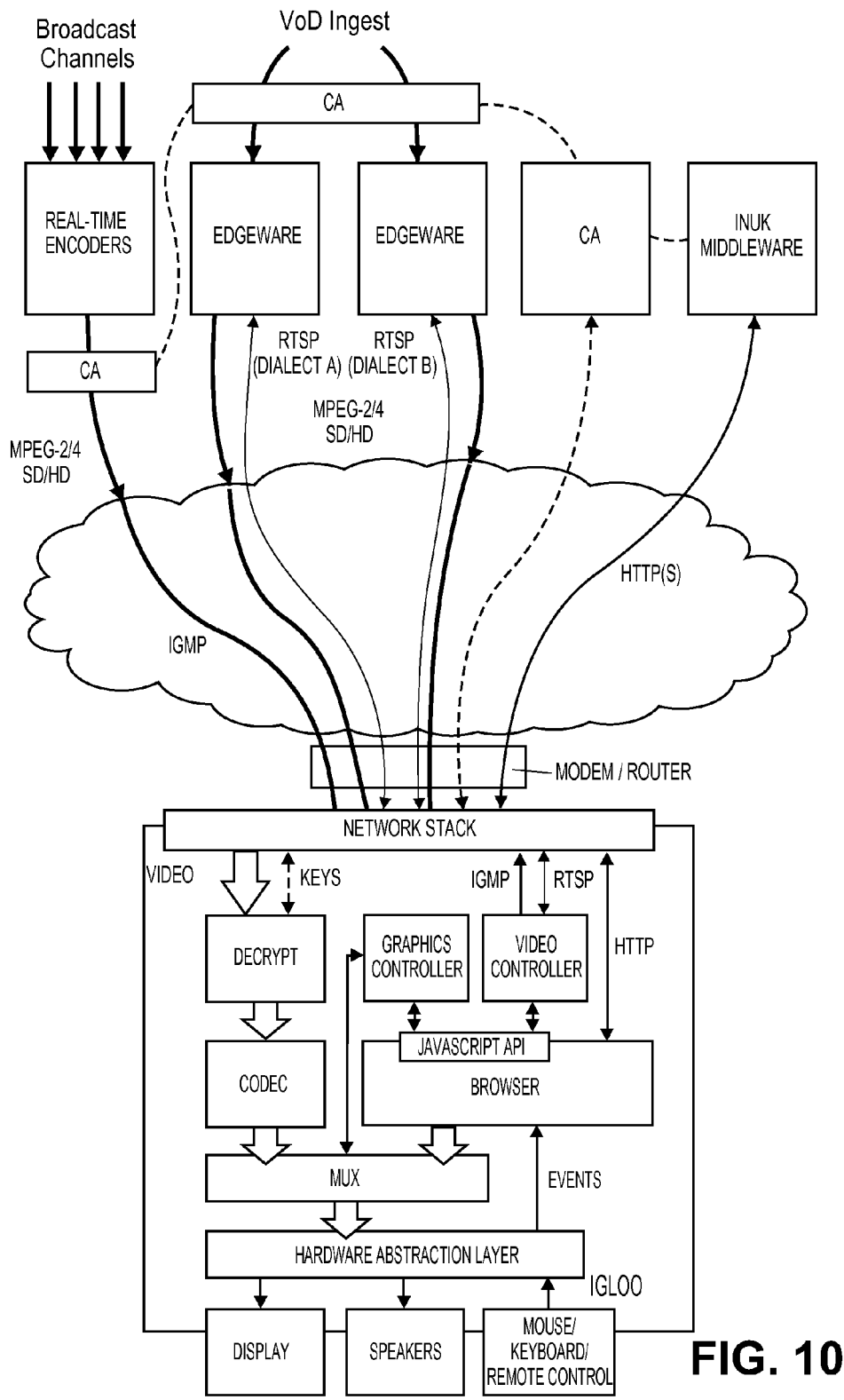
FIG. 10 shows the main components in accordance with a preferred embodiment of the present invention, and illustrates its ability to treat the video and UI layers independently until the point of display on the end device.

Thus, the functional components of the invention (best illustrated in FIG. 10), coupled with the core APIs (shown in FIGS. 3 and 4) allow the middleware to define the exact co-ordinates of each visual element in all 3 planes (X, Y and Z). The Z-plane also includes the ability to apply alpha blending techniques to vary the opacity of the User Interface (UI) layer with respect to the video layer.

Figure 6:
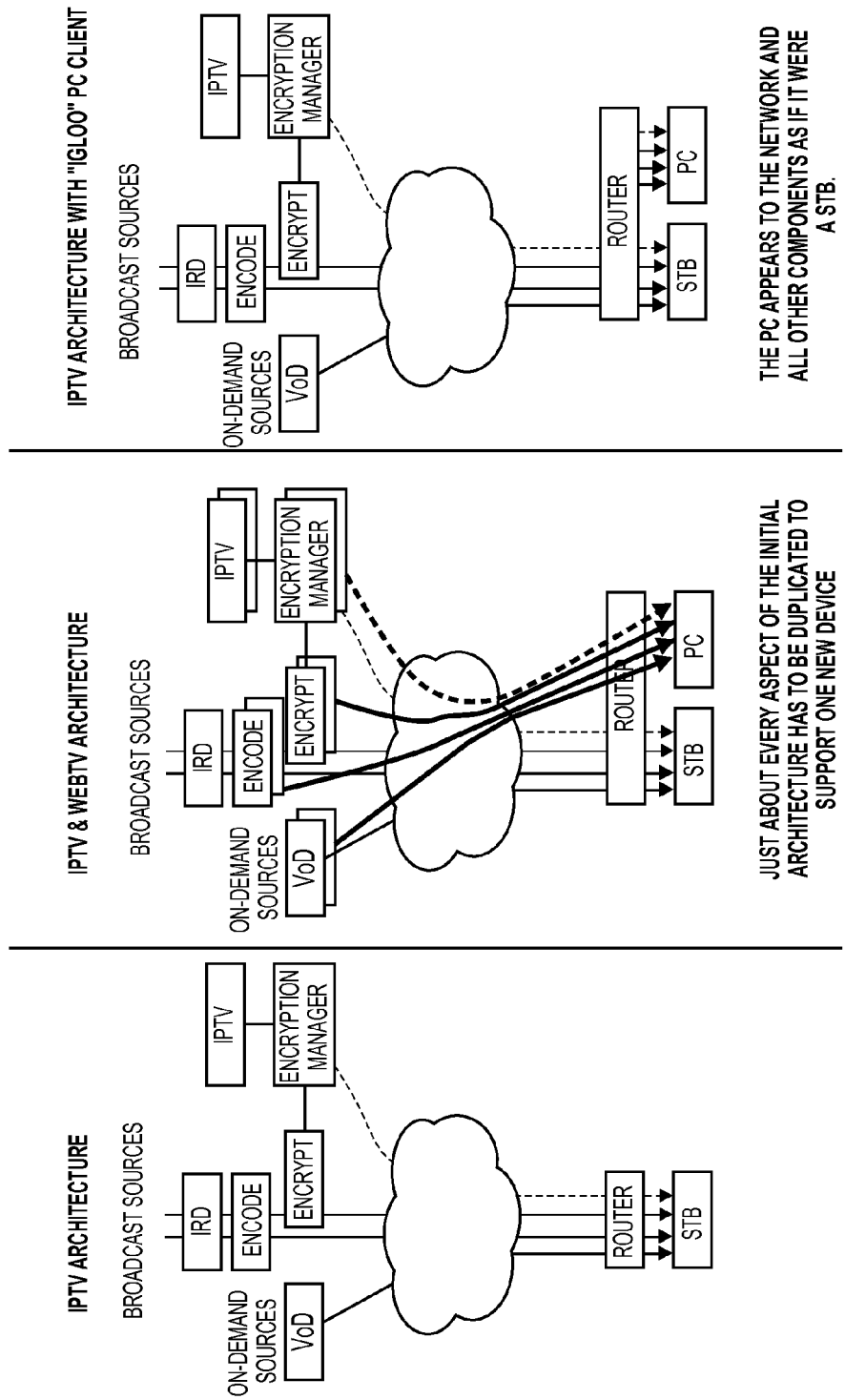
FIG. 6 shows the reduction in effort and expense required on behalf of the service provider when using the present invention.

As shown in FIG. 6, operators are typically forced to consider an almost complete duplication of their television infrastructure when they decide to target devices such as PCs with services. This is generally because the protocols and technologies associated with web TV delivery, as well as its navigational paradigms, differ from those of IPTV implementations. This is largely a result of technological limitations than choice.

When considering WebTV services, operators are usually forced to transrate or transcode their existing content into a more PC 'friendly' format such as Windows Media and Flash. This then requires the employment of alternative Conditional Access and Digital rights Management (DRM) strategies, and must finally re-design their whole UI/presentation layer to overcome the non-TV nature of their target device.

Figure 8:
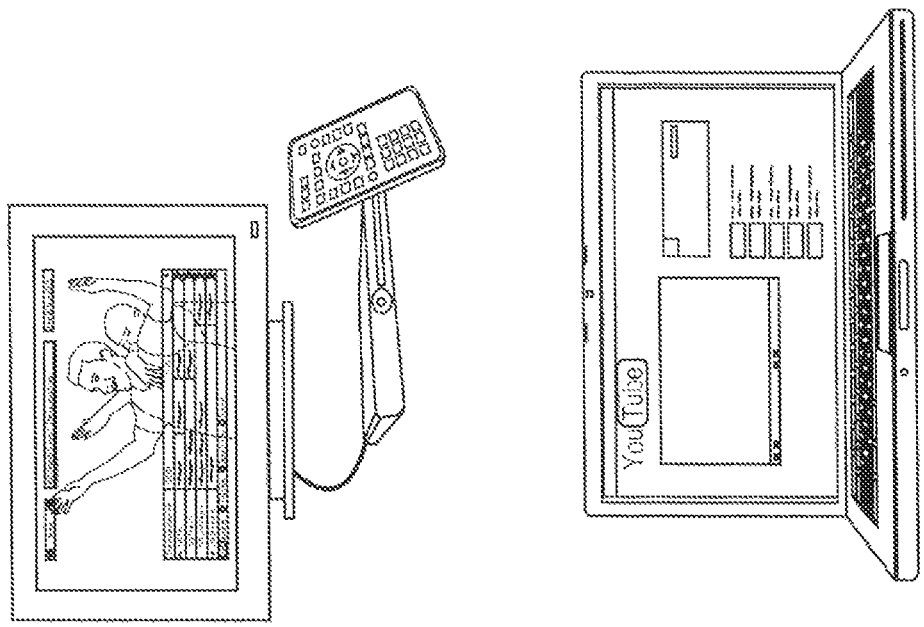
FIG. 8 shows how the architecture of traditional IPTV and web TV systems duplicate each other's core functions, and also shows the different presentation styles when content is displayed for viewing on the different end devices (i.e. a television plus physical STB displaying IPTV content versus a computer displaying web TV content)
Figure 8:
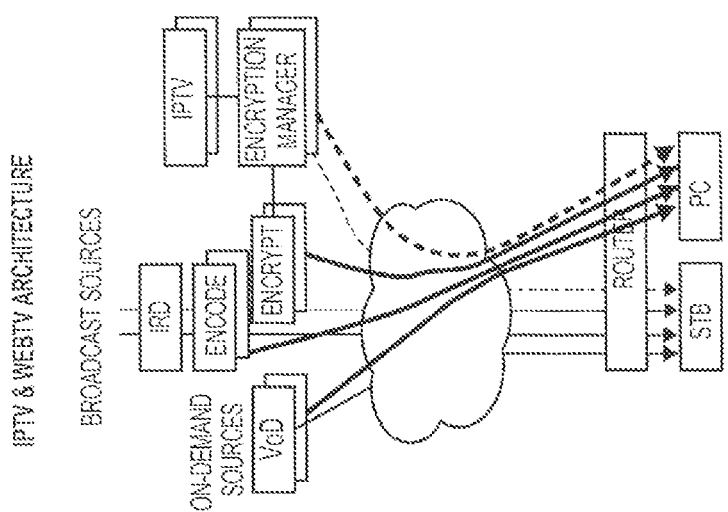
Figure 9:
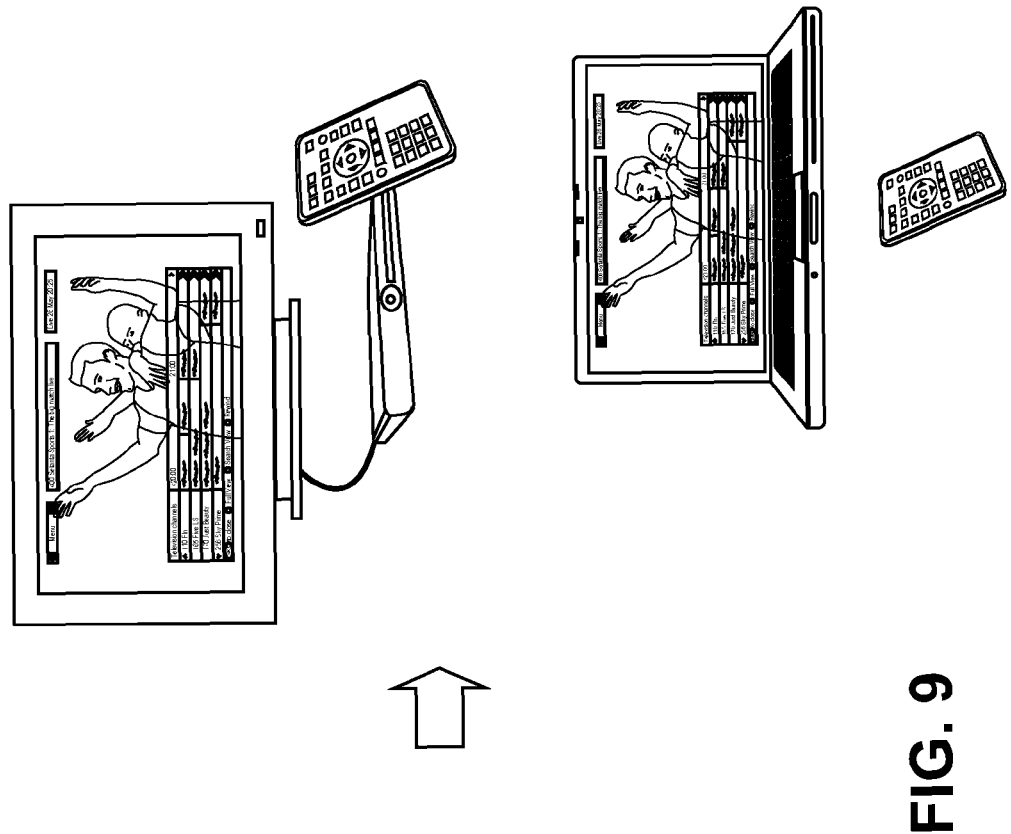
FIG. 9 shows how the present invention eliminates or minimizes the duplication of core functions while providing content to either a television plus STB or computer being used in conjunction with the present invention, and also maintaining the presentation style of the content for the viewer.
Figure 9:
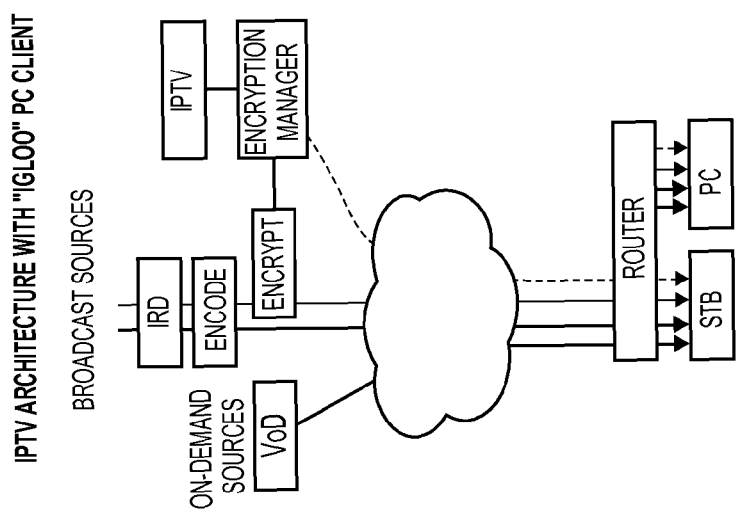

This leads, generally, to implementations where text flows around (not over) the video. FIGS. 7, 8 and 9 emphasize the point by illustrating the result of each of the architectures on the services that can be delivered to the end user.

According to a first aspect of the invention, a computing device is configured and arranged such that an operating system (OS) is able to execute on said computer, and is connected to a network such that data may be received from external source(s) over the network and/or sent to external source(s) over the network.

Figure 2:
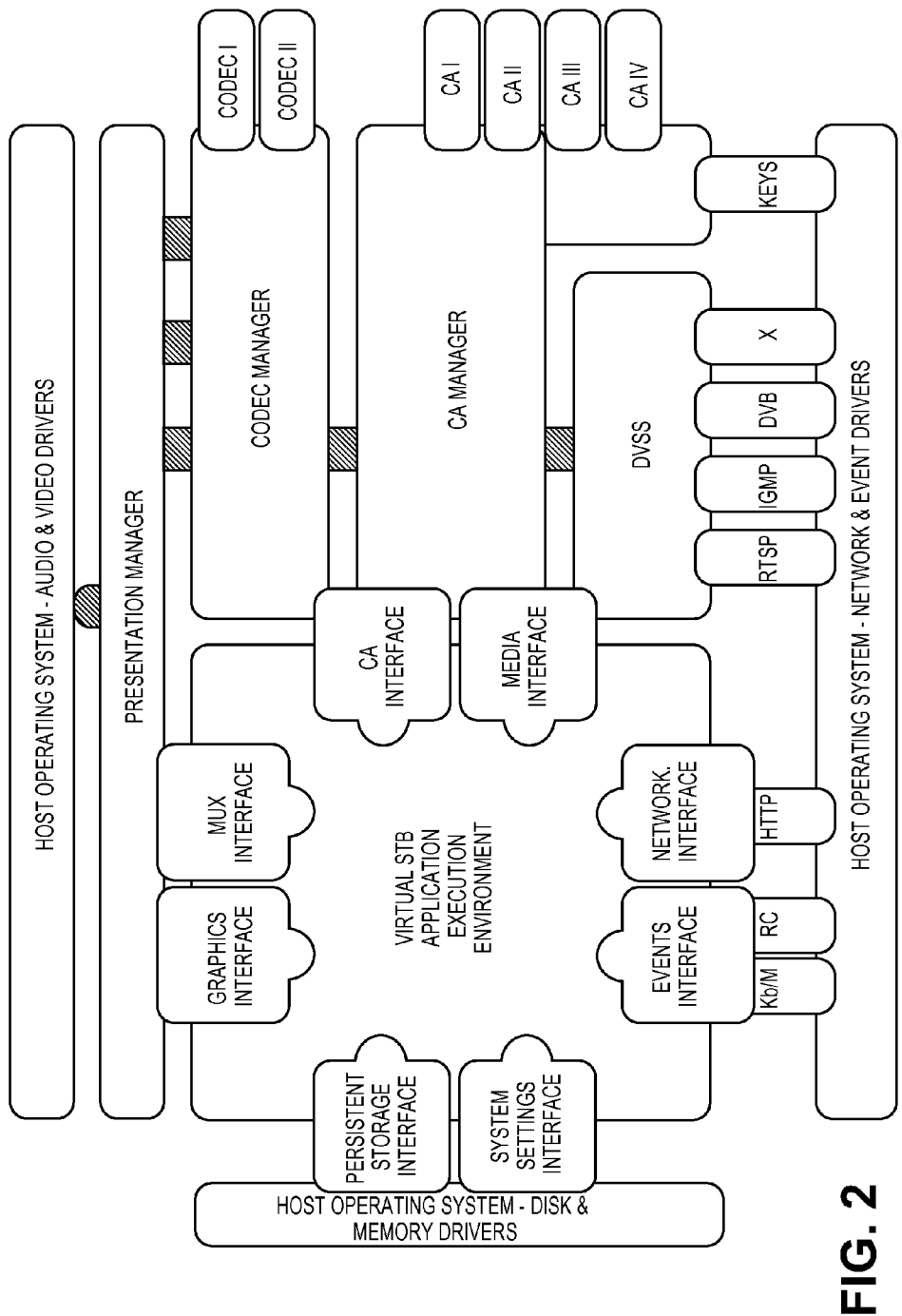
FIG. 2 shows the primary components of a preferred embodiment of the present invention, in particular a typical arrangement wherein the APIs provide the essential interfaces between the operating systems and the emulated environment.

In addition, it is preferred that the computing device is arranged and configured to include a plurality of hardware components such as those included in a typical personal/laptop computing system. Such hardware components may include, but not be limited to:

i) a monitor ('screen') for displaying visual information and programming content;

ii) speakers for presenting sounds and audio content; and iii) a hard drive for recording programming content and/or other data;

FIG. 2 shows how, according to a first aspect of the invention, a plurality of interfaces are provided to enable communication between the OS and the (category I or II) middleware which is embedded within the emulated environment. Said interfaces act as conduits for communication between the OS and components of the emulated STB environment. As such, the interfaces provide the fundamental links between the $3^{rd}$ party middleware embedded within the emulated environment.

Figure 3:
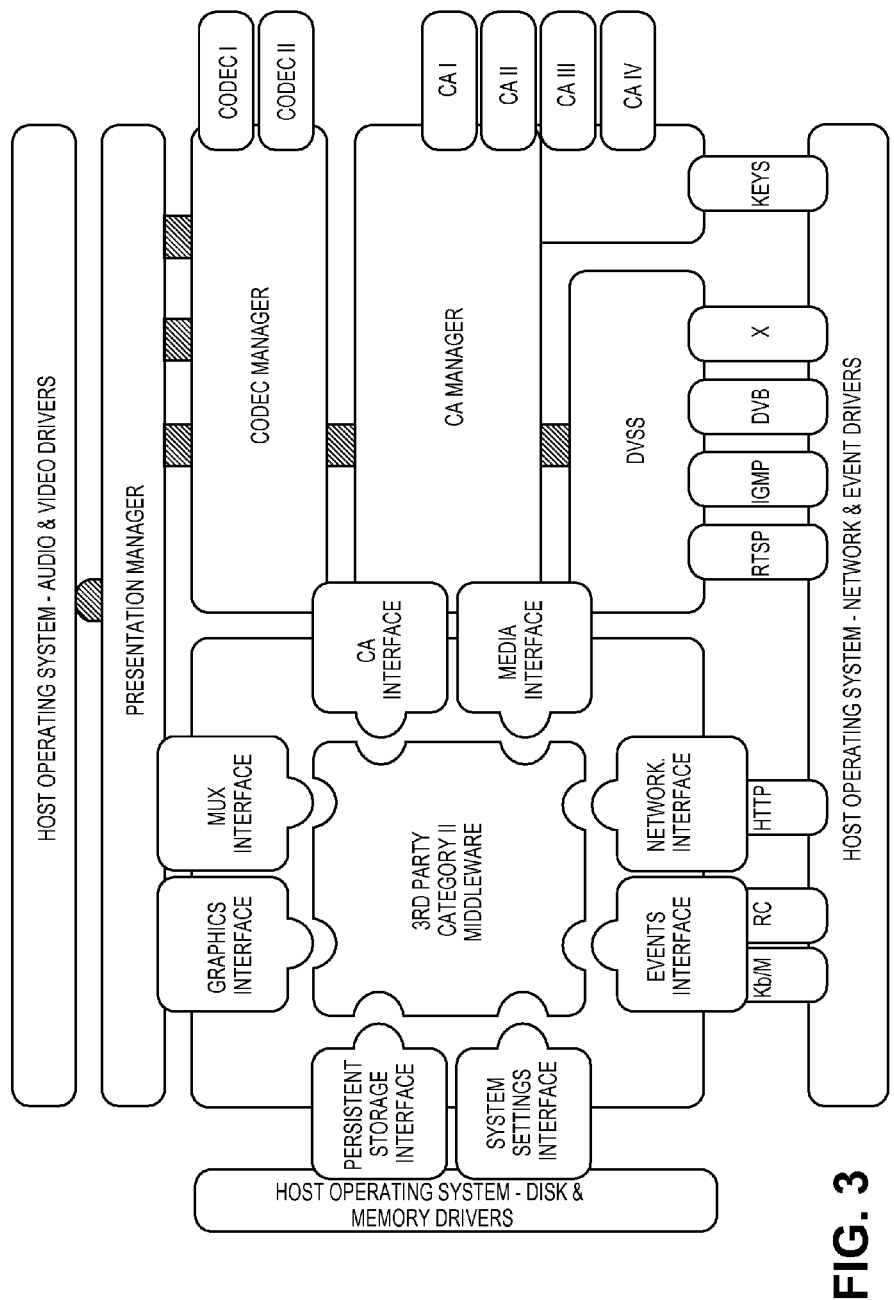
FIG. 3 shows an embodiment wherein the system is arranged and configured for use with (API-based) category II middleware.
Figure 4:
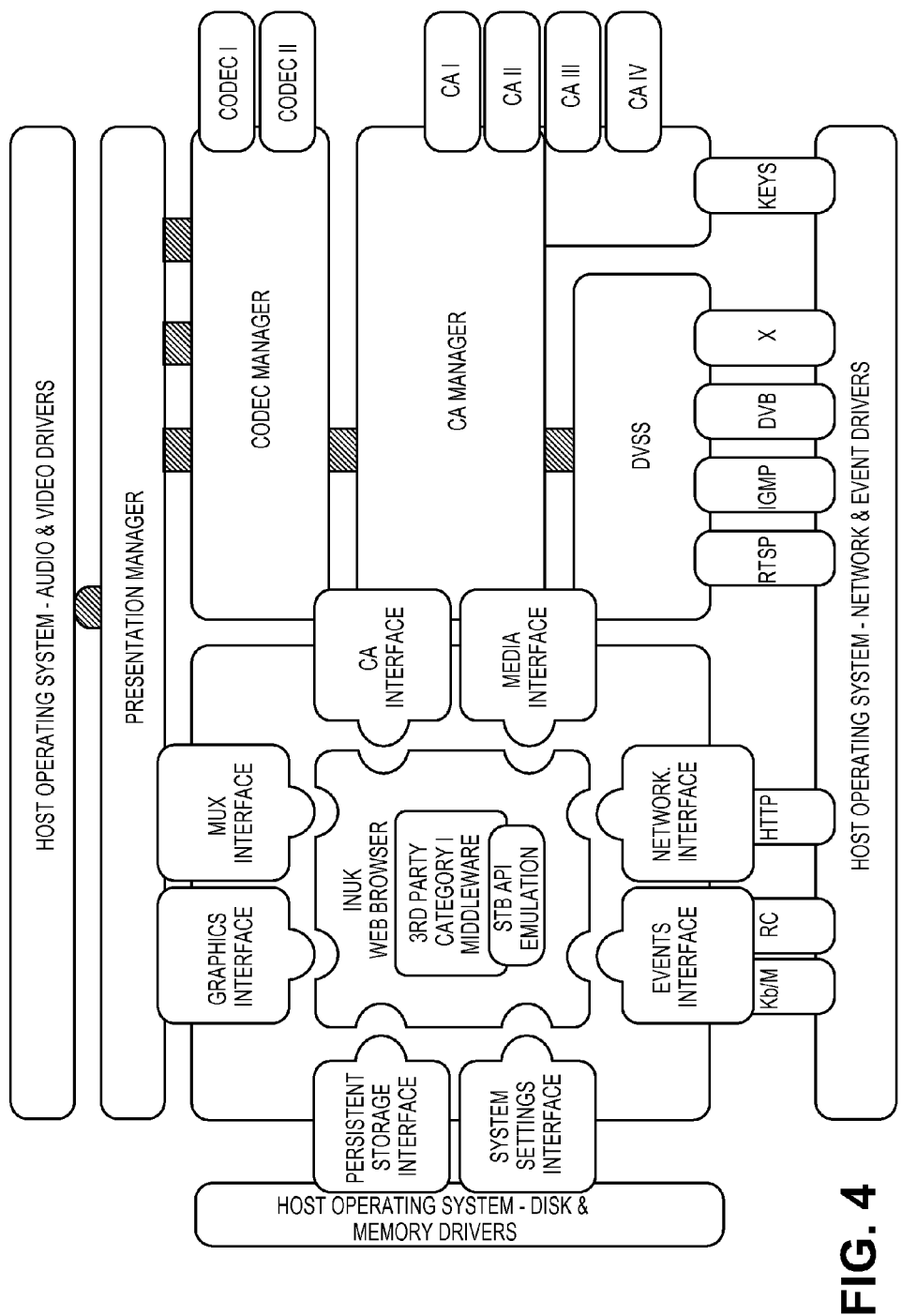
FIG. 4 shows an embodiment wherein the system is arranged and configured for use with (browser embedded) category I middleware.
Figure 5:
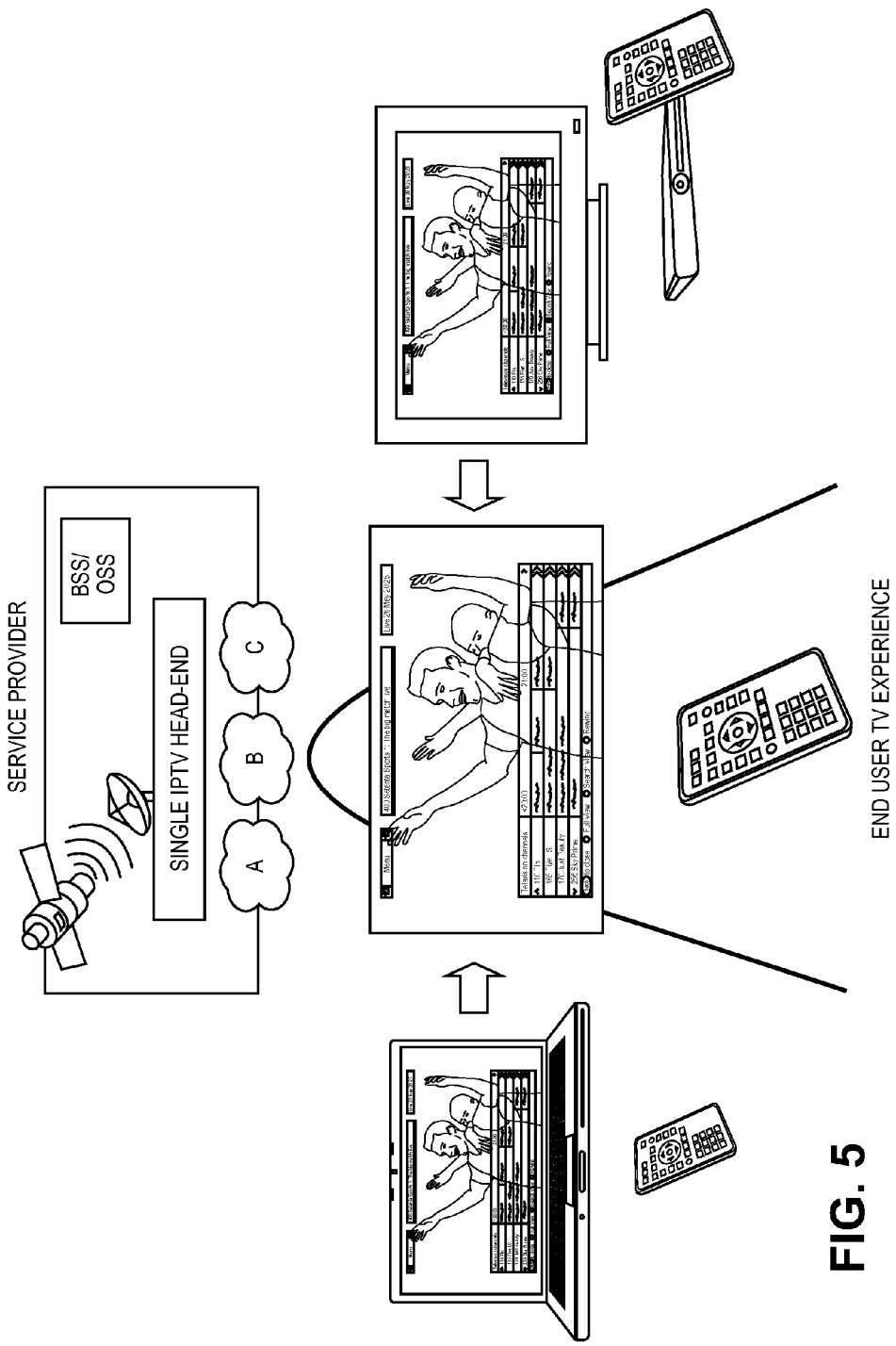
FIG. 5 shows how the televisual presentation of the service is preserved regardless of the device used to present the content.

FIG. 3 shows how the core interfaces (APIs) connect directly to the APIs provided by the category II middleware according to a second aspect of the invention. FIG. 4 shows how the core interfaces (APIs) connect to the proprietary web browser provided according to a third aspect of the invention, the category I middleware being embedded within the DOM of said browser and connecting to the browser via a STB API emulation component.

In a preferred embodiment, said interfaces may provide the following essential capabilities, although other interfaces may be included so as to extend the set of capabilities or, alternatively, some may not be required in alternative embodiments:

1) Graphics interface, providing the application within the emulated STB environment with a mechanism to inform the underlying graphical subsystem that something has changed and that it should now refresh itself;
2) MUX interface, which enables the application within the virtual STB environment to control the UI and video mixing capabilities (including chroma keying and alpha blending);
3) CA interface, which enables applications to initiate the registration of $3^{rd}$ party conditional access subsystems and to interact with the features provided by those vendors;
4) Media interface, which enables applications executing within the emulated STB environment to control the request, decode and display of data streams. Said data streams could contain audio, video or data information. This interface abstracts the application from the underlying transport protocols and codecs required to display the content and simplifies them into a number of simple 'play' commands.

Fundamentally, this addresses the afore-mentioned need to relieve the viewer of the burden of deciding which underlying mechanism is required to receive the desired televisual content. The viewer is not, typically, concerned with selection between IGMP, RTSP, DVB-S/C/T or P2P. Thus, the media interface services requests from the DVSS component of the STB emulator, such that the viewer is able to simply select the content (s)he wishes to watch, the technical aspects of the optimal delivery mechanism being handled 'behind the scenes'. In other words, this subsystem has the capability to make decisions based on the network environment on how best to source and deliver the requested content. Preferably, this abstraction is continued with respect to both container formats and media types, being able to seamlessly decode multiple formats such as MPEG-1, MPEG-2, MPEG-4, WMV, Flash etc.
5) Network Interface, needed to support the abstracted network delivery required by the Media Interface. This interface provides modules for supporting standard video delivery mechanisms: IGMP is provided to handle multicast IP based broadcast content, an intelligent RTSP proxy is provided to communicate in the appropriate RTSP dialect with RFC2326 based servers. HTTP and HTTPS interfaces are also provided for standard Web 2.0 based communications.
6) Event interface, which is the primary interface existing between the OS based interface drivers for keyboard, mouse and remote control devices to pass their inputs/actions on to the application within the emulated STB environment.
7) System Settings Interface, which are provided (primarily) to enable the operator to configure the virtual environment in accordance with his needs and without having to make changes to the STB emulation component itself.
8) Persistent Storage Interface, which provides a mechanism for the application executing within the emulated environment to store both content and content metadata on the local system to enable such features as PVR and 'off-line' modes to be implemented. Additionally, this may facilitate the operation of some middleware products which require this feature to cache carousel delivered EPG metadata.

Figure 12:
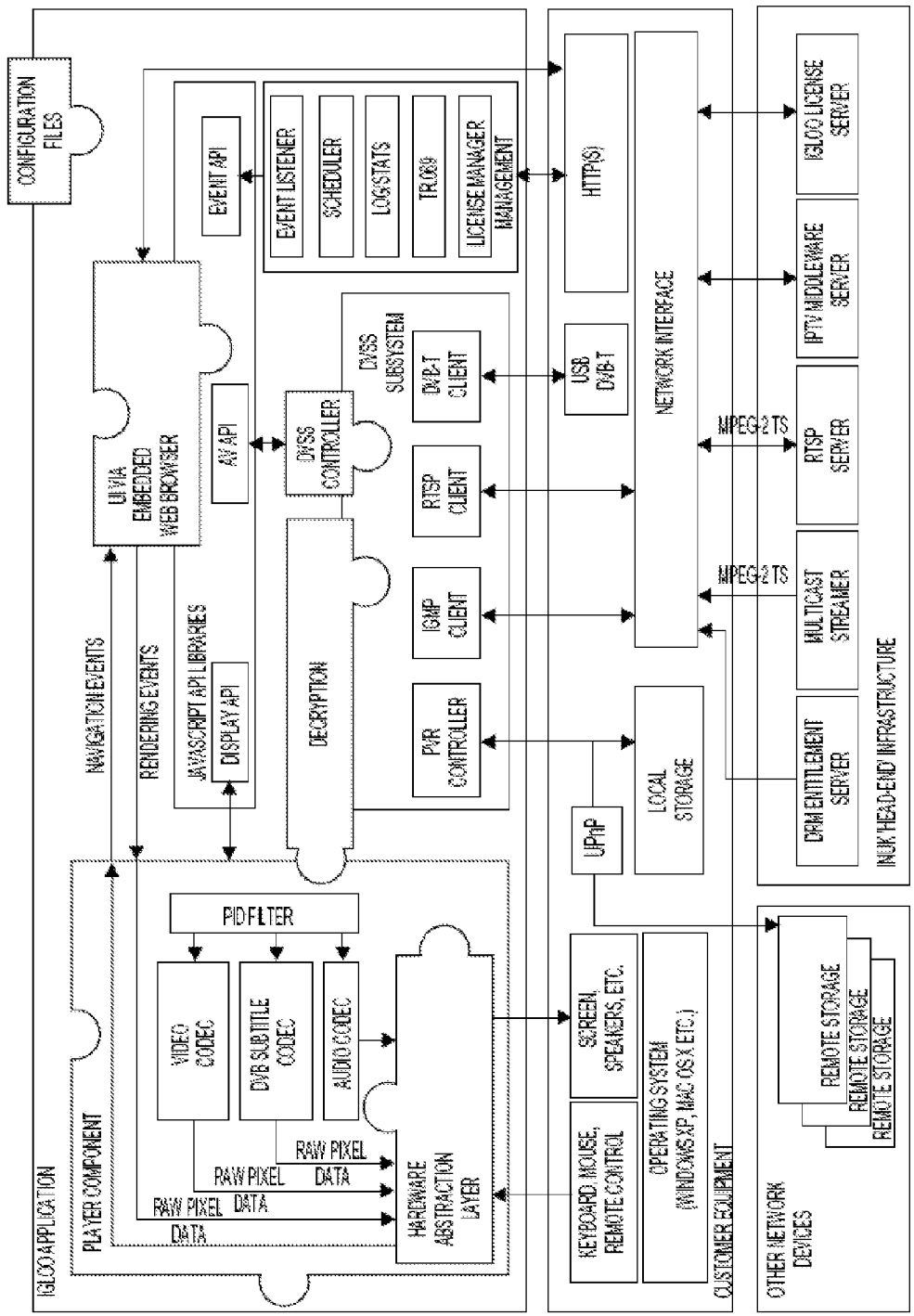
FIG. 12 shows the core components of a system arranged in accordance with an embodiment of the present invention to deliver IPTV content to a device for display to a viewer.

Turning to FIG. 12, a preferred embodiment of the invention is shown, and illustrates in greater detail the STB emulation component of the invention. Said emulation component comprises further subcomponents including:

i) A player component; it is preferred that the player component comprises one or more sub-components, such as a hardware abstraction layer, a video codec component, a DVB subtitle codec component, a PID filter, and an audio codec component.
ii) API libraries; in a preferred embodiment, these are implemented in a language such as Javascript, and may include a display API (to provide connectivity with said player component), an AV API (to provide connectivity with a DVSS controller, which in turn integrates with said DVSS component) and an Event API (which provides support for requests made by the management component).
iii) An embedded web browser; it is preferred that the UI functionality is performed via the embedded web browser provided in accordance with the third aspect of the invention. The embedded Javascript APIs enable the browser to integrate with various other subcomponents of the emulator to control the user interface. For example, a Display API is preferably provided so as to handle requests made via the browser and requiring action by a sub-component of the player component;
iv) A management component; this may further comprise subcomponents such as a scheduler, a log/statistics maintenance component, a licence manager for handling the licensing of the emulation component, a TR-135 client that allows the device to be managed by standards based TR-069 management servers, and an Event Listener which interacts with an Event API provided within the Javascript API libraries.
v) A decryption component which integrates with said DVSS component and said player component;

FIGS. 4 and 12 show a web browser embedded within a typical embodiment of the third aspect of the invention such that (when using category I middleware) UI functionality may be performed via the embedded proprietary browser. Preferably, the browser complies with the interfaces such that Category I middleware can be executed on the viewer's computer without modification. The STB API emulation component is inserted into the DOM of the browser (3) and accurately represents the interface corresponding to the STB which is being emulated. In a preferred embodiment, this API emulation component can be inserted dynamically and as such the browser is capable of emulating many standard IPTV STBs. The APIs themselves provide a mapping from the Javascript language directly to the underlying C APIs. The DOM object is also capable of registering callback events so that events occurring within the hardware environment can be reported back to the javascript application for actioning.

Figure 11:
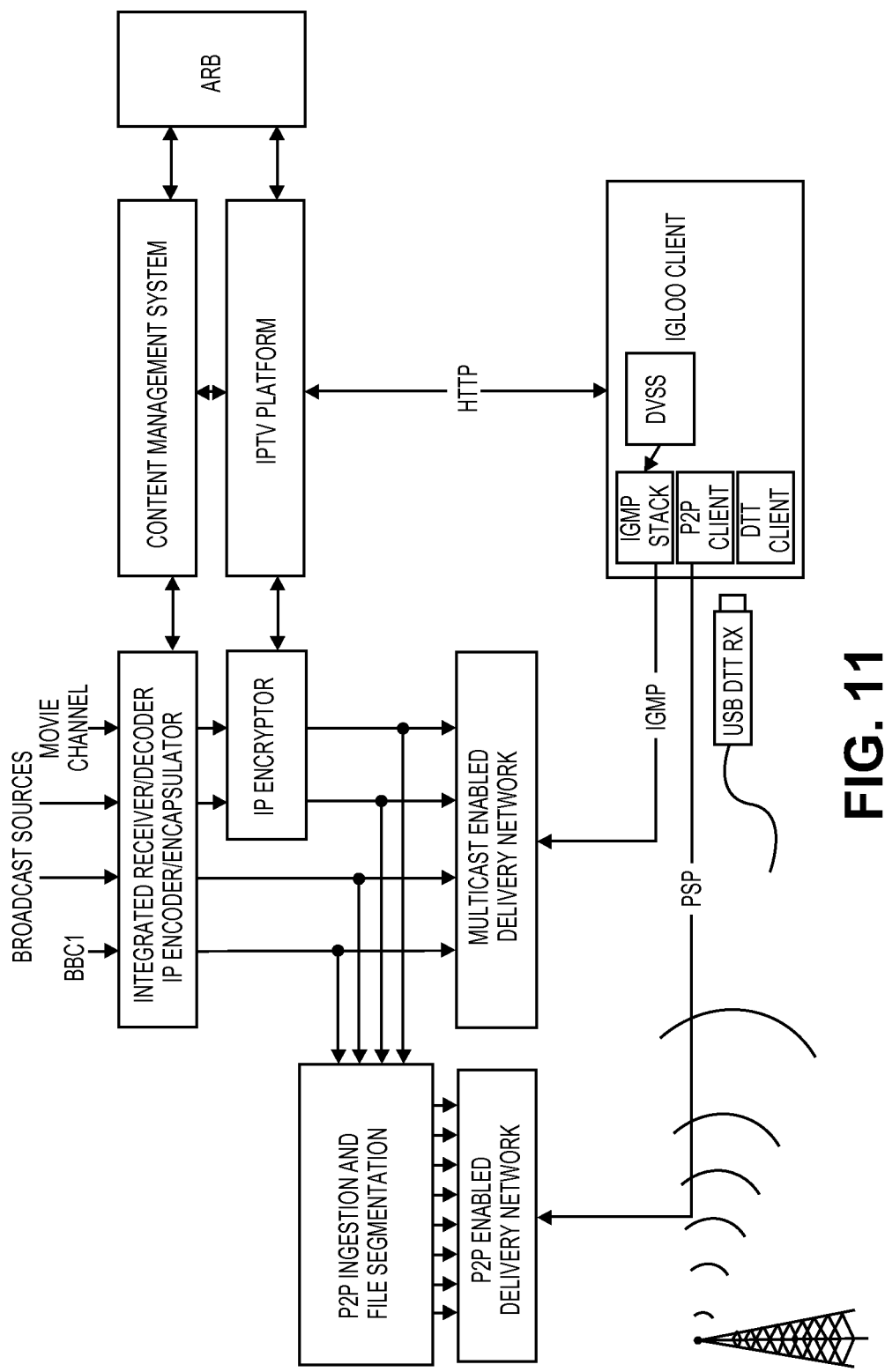
FIG. 11 shows a detailed scheme of one aspect of the present invention, specifically the DVSS subsystem for performing dynamic source selection.

Turning to a preferred embodiment of the fourth aspect of the invention, a DVSS component is provided and is integrated with the emulation sub-components described above. The DVSS component implements the concept of dynamic video source selection, which is most clearly illustrated in FIG. 11.

Preferably, the DVSS component further comprises subcomponents such as (but not restricted to) a PVR controller, an IGMP client, a RTSP client and a DVB-T client. The DVSS component integrates with a controller which in turn is supported by an AV API contained within the afore-said Javascript API libraries. In a preferred embodiment, the DVSS component may also integrate with the decryption component.

In a typical embodiment, a management component is provided which enables a network operator to manage the system as if it were a router or a physical STB. This further comprises a TR-135 client which allows the management according to standards based TR-069 based management servers.

In a typical embodiment, a decryption component is provided, and forms an interface between said DVSS component and said player component. The role of this component is to receive signals from a dynamically selected source, decrypt said signals and pass them on to the player component for further processing and display.

In a typical embodiment, API libraries, implemented in a language such as Javascript, are provided and may include a display API (to provide connectivity with said player component), an AV API (to provide connectivity with a DVSS controller, which in turn integrates with said DVSS component) and an Event API (which provides support for requests made by the management component).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A set-top box emulation system for presenting IPTV content to a user on a general purpose electronic device, said emulation system comprising:
   a middleware component associated with a provider of the IPTV content, wherein the middleware component is designed for execution on a physical set top box;
   a plurality of management components arranged and configured to emulate the capabilities of the physical set-top box to the middleware component, wherein the plurality of management components comprises at least one of a presentation manager, a codec manager and/or a conditional access manager; and
   a plurality of interfaces to enable communication between said plurality of management components and said middleware component to thereby allow the middleware component to operate on the general purpose electronic device as if the general purpose electronic device was the physical set top box.

2. The set-top box emulation system of claim 1, wherein the plurality of interfaces comprises at least one of a graphics interface, a MUX interface, a Conditional Access interface, a Media interface, and Events Interface, a System Settings interface and/or a Persistent Storage interface.

3. The set-top box emulation system of claim 1, wherein the plurality of management components also includes a browser, said browser being configured for integration with said middleware component.

4. The set-top box emulation system of claim 3, wherein said middleware component is inserted into the Document Object Model (DOM) of said browser.

5. The set-top box emulation system of claim 4, wherein said middleware component integrates with said browser via a second plurality of interfaces.

6. The set-top box emulation system of claim 1, wherein a user interface is managed by said middleware component.

7. The set-top box emulation system of claim 1, wherein the plurality of management components also includes a dynamic video source selection (DVSS) component, said DVSS component comprising further subcomponents and being configured to integrate with said plurality of management components, said subcomponents comprising at least one of a PVR controller, an IGMP client, a RTSP client and a DVB-T client.

8. A method of emulating functions of a set-top box so as to present IPTV content to a viewer on a general purpose electronic device, the method comprising:
   receiving IPTV content by said electronic device from a network;
   using a plurality of set-top box emulation components to create an emulated set-top box environment within said electronic device;
   executing a middleware component associated with a provider of the IPTV content that is designed for execution on a physical set top box within said emulated environment, said middleware component communicating with said emulated environment via a plurality of interfaces to thereby allow the middleware component to operate on the general purpose electronic device as if the general purpose electronic device was the physical set top box.

9. The method of claim 8, wherein the plurality of set-top box emulation components comprises one or more of a presentation manager, a codec manager and/or a conditional access manager.

10. The method of claim 9, wherein the plurality of interfaces comprises at least one of a graphics interface, a MUX interface, a Conditional Access interface, a Media interface, and Events Interface, a System Settings interface and/or a Persistent Storage interface.

11. A computer-implemented method of emulating a physical set-top box (STB) with a general purpose electronic device, comprising:
   receiving Internet Protocol Television (IPTV) content from an IPTV service provider over a connection of an electronic device from an Internet Protocol (IP) closed network by the general purpose electronic device;

executing by the electronic device a middleware component associated with the IPTV service provider, wherein the middleware component is designed originally for use with the physical STB, and wherein the executing comprises emulating hardware capabilities of the physical STB to process the IPTV content, to thereby allow the middleware component to operate on the general purpose electronic device as if the general purpose electronic device was the physical STB; and presenting the IPTV content on a display of the electronic device.

12. The method of claim 11, wherein said executing comprises:

providing a plurality of STB emulation components to create an emulated STB environment within said electronic device; and executing the middleware component within the emulated STB environment via a plurality of interfaces of the emulated STB environment that enables communication between the plurality of STB emulation components and the middleware component.

13. The method of claim 12, wherein the plurality of interfaces and the middleware component are embedded within a Document Object Model (DOM) of a browser operating on the electronic device, and wherein said executing further comprises:

receiving DOM requests at the browser; and translating the DOM requests into application programming interface (API) requests for interaction with the middleware component.

14. The method of claim 12, wherein said receiving comprises receiving the IPTV content from a head-end of an IPTV system over the IP closed network, and wherein said executing comprises:

managing access by the electronic device to the IPTV content using a CA manager and a CA interface between the middleware component and the CA manager;

managing presentation of the IPTV content on the display using a presentation manager and a graphics interface, wherein the graphics interface enables the middleware component with mechanism to inform the underlying graphical subsystem to refresh the display; and managing presentation of a user interface layout on the display using the presentation manager and a multiplexing (MUX) interface, wherein the MUX interface enables the middleware component to control user interface (UI) and video mixing of the IPTV content for said presenting.

15. The method of claim 14, wherein the IPTV content is encoded by the head-end of the IPTV system, and wherein said executing further comprises:

managing requesting and decoding of the IPTV content by the electronic device using a codec manager, a media interface, and a network interface, wherein the media interface and network interface enable the middleware component to control requesting, decoding, and displaying of the IPTV content;

receiving one or more events over an event interface, wherein the event interface enables the middleware component to receive inputs or actions from an operating system (OS) based interface driver for one or more user input devices;

managing one or more settings of the emulated STB environment using a system setting interface, wherein the system interface enables an operator to configure the emulated STB environment without having to make changes to the plurality of STB emulation components themselves; and managing storage of the IPTV content and content metadata on a local system using a persistent storage interface, wherein the persistent storage interface enables at least one of personal video recorder (PVR) features, off-line modes, or caching carousel delivered electronic programming guide (EPG) metadata.

16. The method of claim 14, wherein the IPTV content is encrypted and encoded by the head-end of the IPTV system, and wherein executing the middleware component comprises:

providing two-way communication between the head-end system and the electronic device over the IP closed network;

managing access by the electronic device to the IPTV content using a CA manager and a CA interface between the middleware component and the CA manager, wherein said managing the access comprises initiating registration of the middleware component with the CA system on the IPTV head-end system; and decrypting the IPTV content received from the head-end of the IPTV system; and decoding the IPTV content received from the head-end of the IPTV system.

17. The method of claim 16, wherein said providing two-way communication comprises communicating with the head-end of the IPTV system over the IP closed network as if it were a physical STB.

18. The method of claim 16, wherein said providing two-way communication comprises communicating with the head-end of the IPTV system over the IP closed network as if it were a router.

19. The method of claim 11, wherein the IPTV content is video content, and wherein the emulated hardware capabilities includes at least one of video processing of the video content, user interface (UI) layout generation, and remote-control key handling, and wherein the video processing comprises at least one of decoding the IPTV content, video scaling of the IPTV content, video positioning of the IPTV content, chroma keying of the IPTV content, and alpha blending of the IPTV content.

20. The method of claim 11, wherein the emulated hardware capabilities includes generating a user interface (UI) layout to be presented on the display of the electronic device.

* * * * *